Patented Apr. 28, 1925.

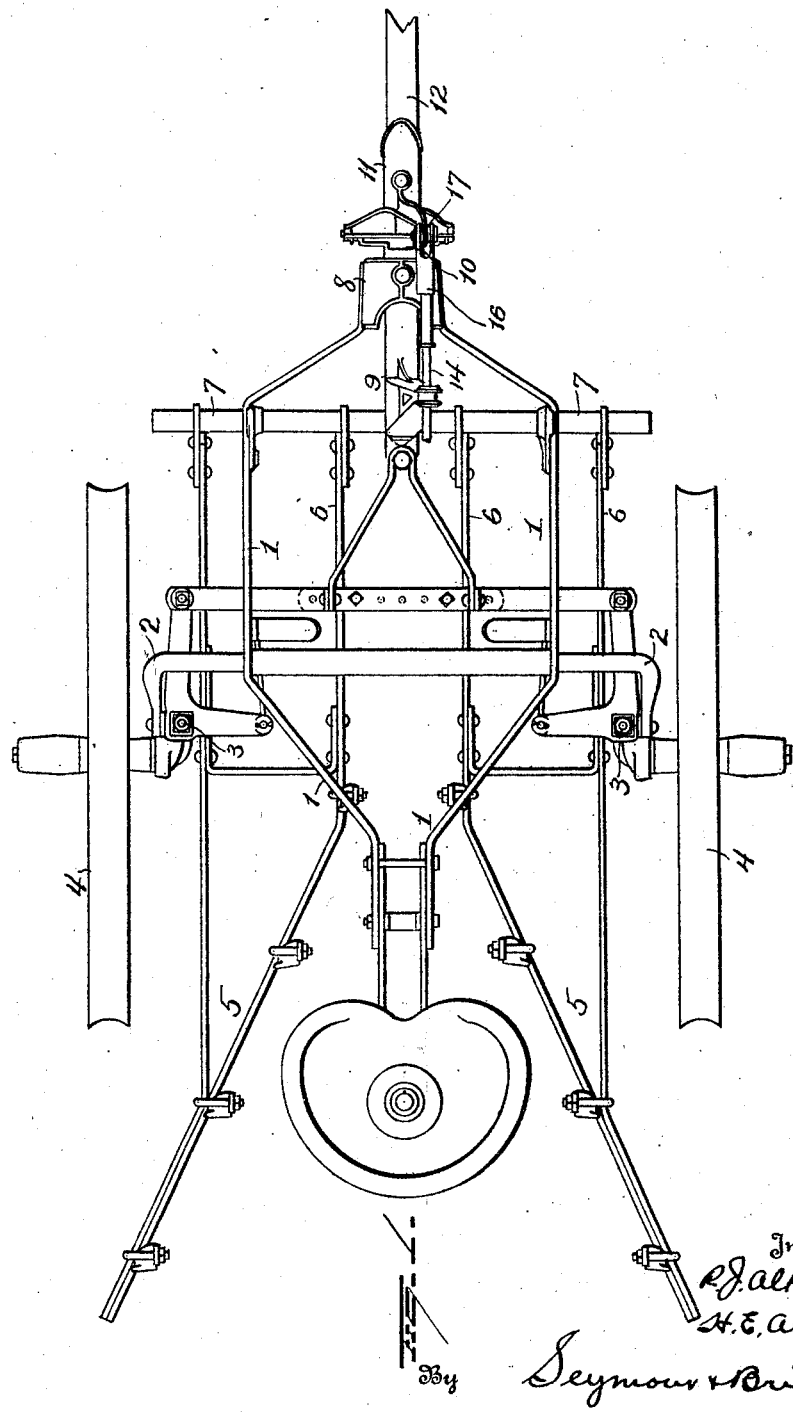

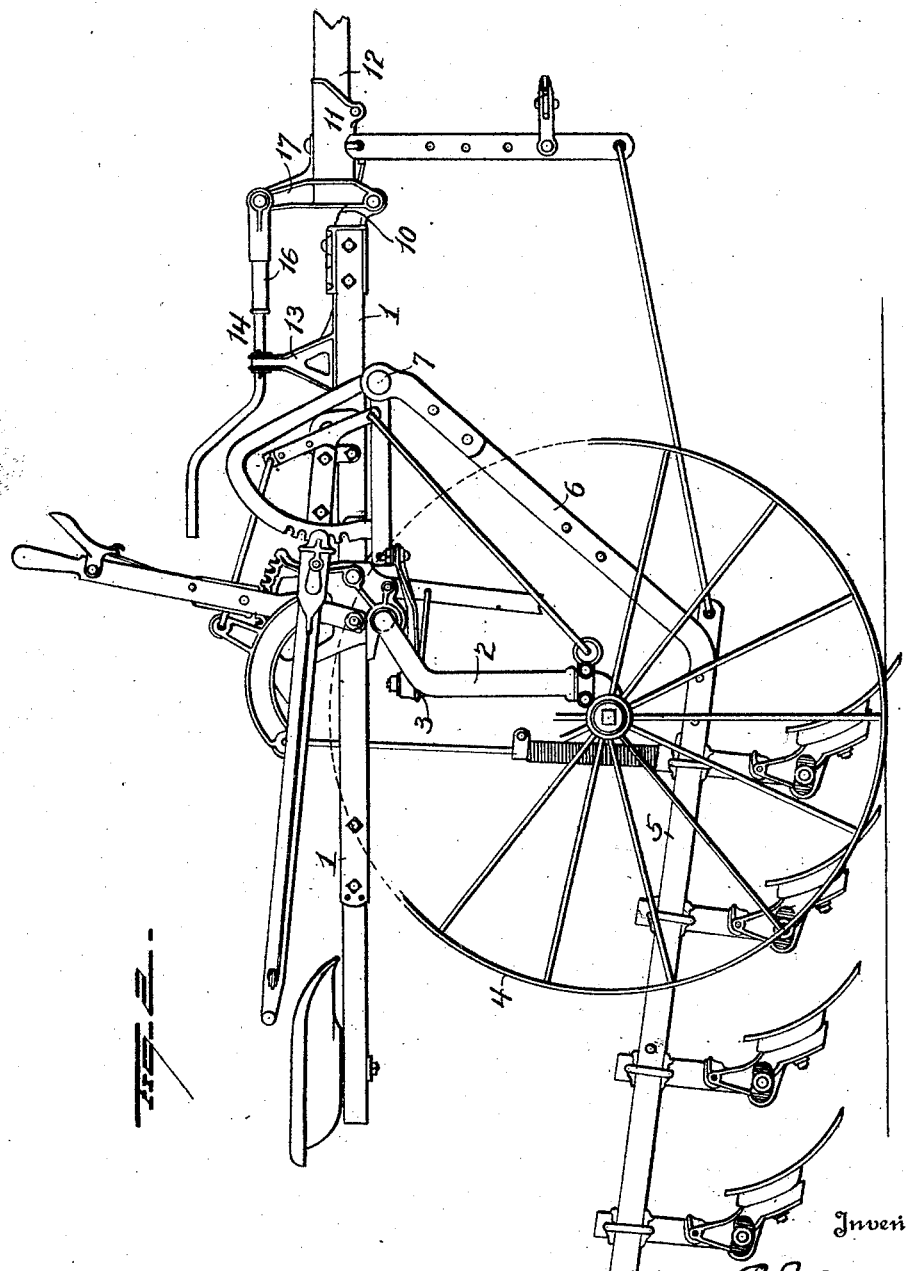

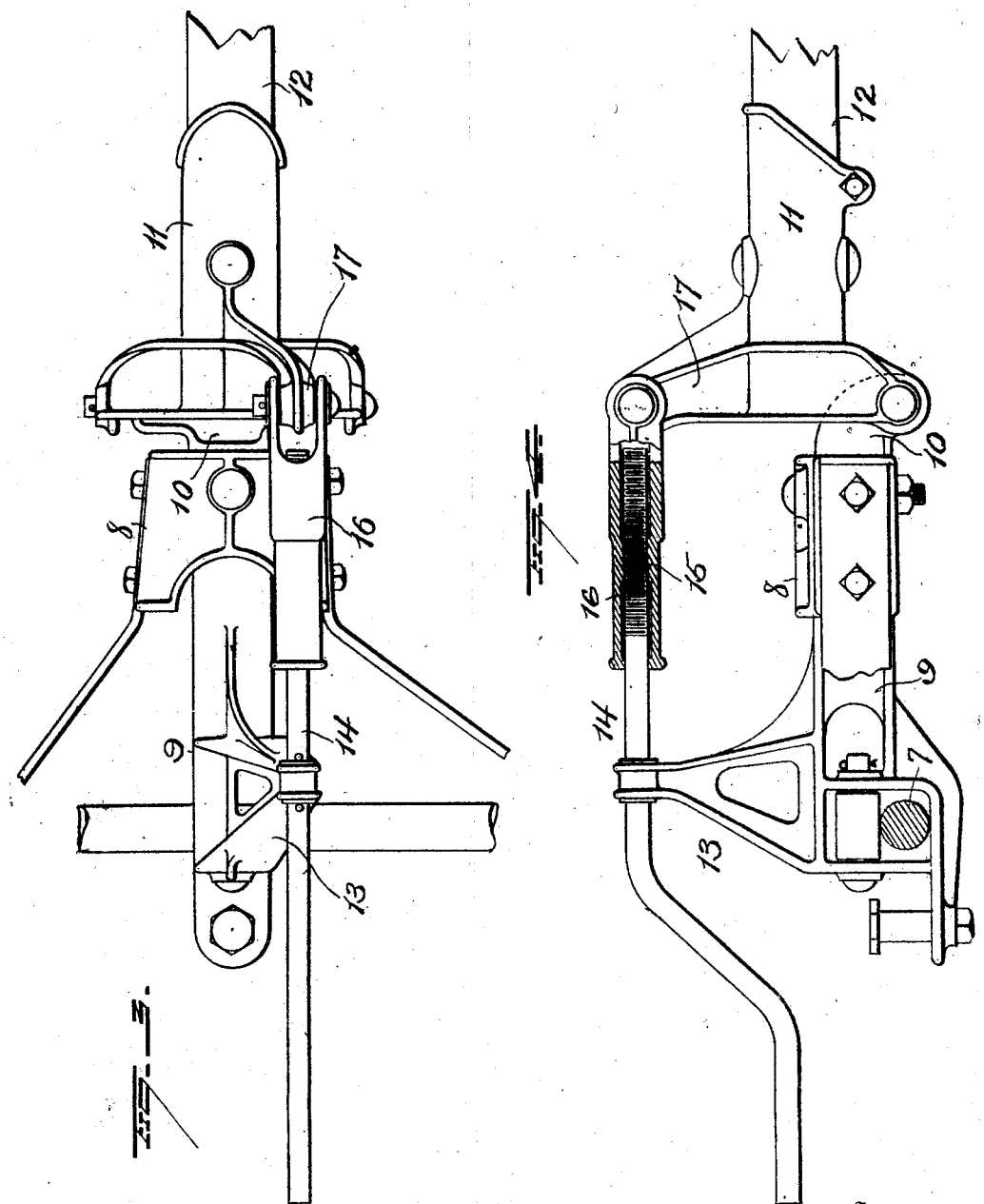

1,535,887

UNITED STATES PATENT OFFICE.

RUDOLPH J. ALTGELT AND HERMAN E. ALTGELT, OF SOUTH BEND, INDIANA, ASSIGNORS TO OLIVER CHILLED PLOW WORKS, OF SOUTH BEND, INDIANA.

WHEELED CULTIVATOR.

Application filed August 8, 1922. Serial No. 580,451.

*To all whom it may concern:*

Be it known that we, RUDOLPH J. ALTGELT and HERMAN E. ALTGELT, citizens of the United States, and residents of South Bend, in the county of Saint Joseph and State of Indiana, have invented certain new and useful Improvements in Wheeled Cultivators; and we do hereby declare the following to be a full, clear, and exact description of the invention, such as will enable others skilled in the art to which it appertains to make and use the same.

This invention relates to improvements in wheeled cultivators and has particular reference to adjusting means for the cultivator gangs,—one object of the invention being to provide simple and efficient means for readily effecting adjustment of the cultivator gangs relatively to the pole in such manner as to regulate the depth of penetration of the shovels relatively to each other, so that the rear shovels of a gang may be raised or lowered relatively to the positions of the forward shovels.

With this and other objects in view, the invention consists in certain novel features of construction and combinations of parts as hereinafter set forth and pointed out in the claims.

In the accompanying drawings, Figure 1 is a plan view of a wheeled cultivator embodying our improvements. Figure 2 is a side elevation. Figure 3 is an enlarged detail plan view showing our improved adjusting devices, and Figure 4 is a side elevation, partly in section, of the structure shown in Figure 3.

The main frame of the cultivator is indicated at 1 and on this frame suitable mountings are provided for a main crank axle 2 carrying pivot axle members 3 for carrying wheels 4. Two cultivator gang frames 5—5 are provided at their forward portions with upwardly inclined extensions 6—6,—the latter being connected with the cultivator frames through the medium of a transverse shaft 7 mounted upon the latter.

The forward end of the main frame carries a hollow casting 8 in which the forward portion of a stub pole 9 is mounted. The stub pole 9 carries at its forward end a bracket 10 to which the lower end of a socketed main pole bracket 11 is pivoted,—said bracket receiving the main pole 12. The stub pole 9 is provided at its rear end portion with an upwardly projecting bracket arm 13 having a bearing for a manually operable shaft 14,—the latter being provided with a threaded portion 15 which engages threads within a tubular member 16 pivotally connected with the upwardly projecting portion or arm 17 of the main pole bracket 11.

With the construction and arrangement of parts above described the cultivator frame may be so adjusted relatively to the pole as to change the relation of the forward shovels of the gang frames to the ground and to the rear shovels. In other words, the rear shovels of the gangs may be caused to penetrate the ground more deeply than the penetration of the forward shovels or vice versa or the cultivator gangs may be so adjusted as to level them in such manner as to cause all the shovels to penetrate the ground the same depth. It is apparent that the above mentioned results may be readily and quickly attained by manipulation of the threaded adjusting device between the main pole bracket and the bracket 13.

Having fully described our invention what we claim as new and desire to secure by Letters-Patent, is:

1. In a cultivator, the combination with a wheeled frame and cultivator gang frames connected therewith and carrying cultivator shovels, of a pole bracket having pivotal connection with the frame by a horizontal pivot, and screw adjusting devices between said pole bracket and a part connected with the cultivator frame for effecting relative movement of said cultivator frame and the pole bracket on said horizontal pivot.

2. In a cultivator, the combination with a wheeled frame and cultivator gangs connected therewith and a stub pole connected with said frame, of a main pole bracket connected with said stub pole by a horizontal pivot, said pole bracket having an upwardly projecting arm, an internally threaded member pivoted to said arm, a bracket arm projecting above the stub pole and provided with a bearing, and a manually operable screw shaft mounted in said bearing and entering said internally threaded member.

3. A frame and pole connection comprising a pole bracket adapted for connection with the frame by a horizontal pivot, a screw adjusting device having one member connected with said pole bracket, and a member adapted for connection with the frame and providing a mounting for another member of said screw adjusting device.

In testimony whereof, we have signed this specification in the presence of two subscribing witnesses.

RUDOLPH J. ALTGELT.
HERMAN E. ALTGELT.

Witnesses:
JENNIE M. DAVIS,
HELEN GOSS.